Figure 1:
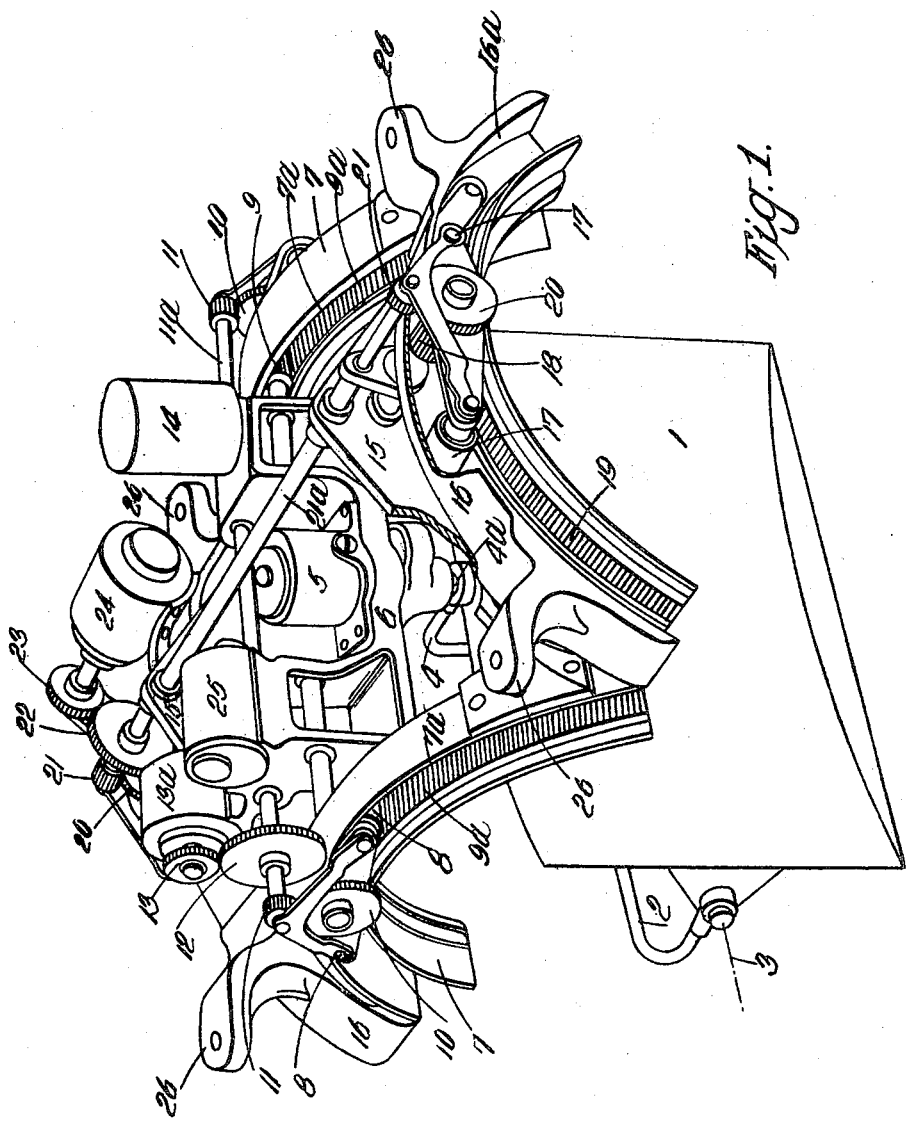

March 21, 1950 — D. O. SPROULE — 2,501,479
MOUNTING OF STABILIZED PLATFORMS ON MOVING VEHICLES Filed Aug. 17, 1945 — 2 Sheets-Sheet 1

INVENTOR
Donald O. Sproule
BY
ATTORNEYS

March 21, 1950
D. O. SPROULE
2,501,479
MOUNTING OF STABILIZED PLATFORMS ON MOVING VEHICLES
Filed Aug. 17, 1945
2 Sheets-Sheet 2
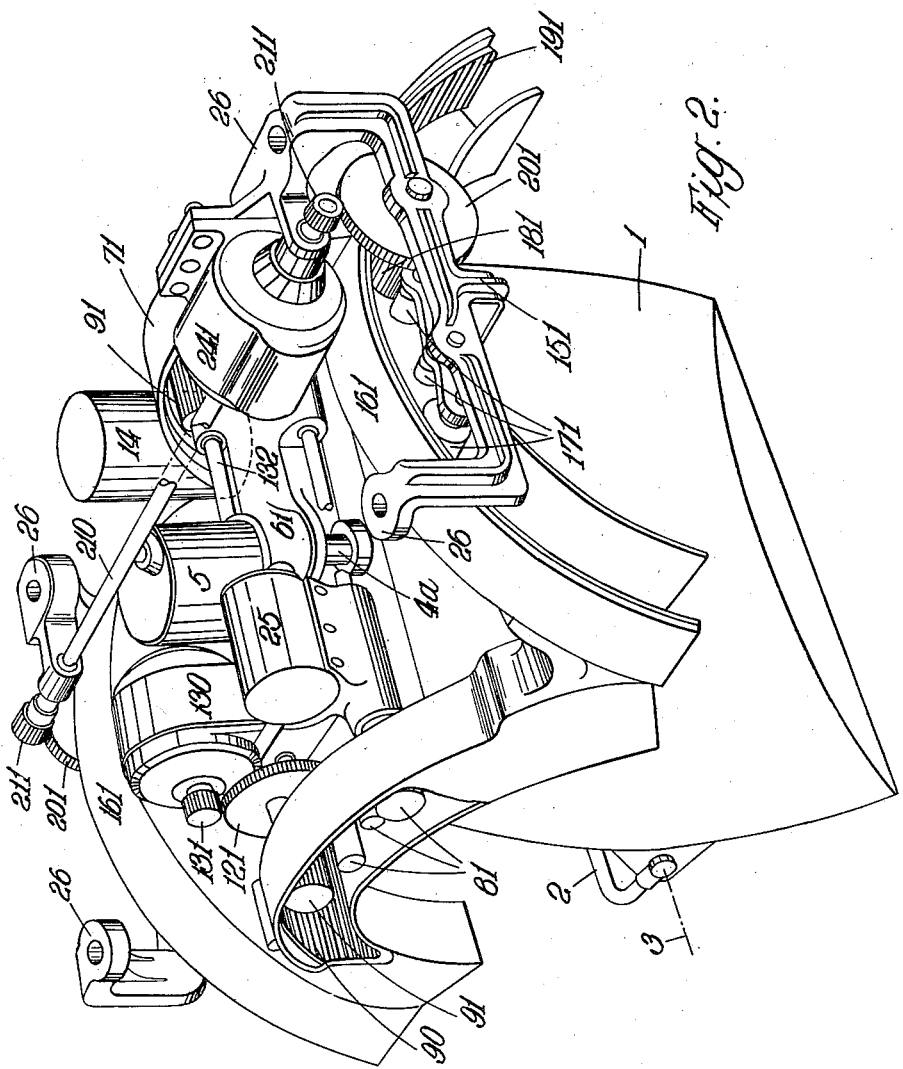
Inventor
Donald Orr Sproule
By
Campbell, Brumbaugh, Free & Graves
his Attorneys Patented Mar. 21, 1950

2,501,479

UNITED STATES PATENT OFFICE 2,501,479

MOUNTING OF STABILIZED PLATFORMS ON MOVING VEHICLES

Donald Orr Sproule, London, England, assignor to Henry Hughes & Son Limited, London, England, a British limited liability company Application August 17, 1945, Serial No. 611,185
In Great Britain June 30, 1944

5 Claims. (Cl. 318—19)

This invention relates to improvements in the mounting of stabilised platforms on moving vehicles and has for its object to provide simple, reliable and robust mechanism so operating that all the externally disposed moving parts can be enclosed in a casing of minimum dimensions.

The invention on one form contemplates a stabilised radar scanner system operating effectively within a shield of minimum dimensions.

The invention in a more developed form contemplates a stabilised radar scanner system that can be enclosed within a shield of minimum dimensions and be arranged so that the radiated beam can be displaced from the horizontal thus enabling the beam, during rotation, to sweep through a conical path.

An aircraft in flight is exposed to angular movements about three axes i. e. movement about a transverse axis due to pitch, movement about a longitudinal axis due to roll and movement about a vertical axis due to turning and when a radar scanner system, comprising wave guides and a rotatable reflector is mounted on such aircraft it is essential that the vertical axis shall be stabilised and that all the moving parts projecting externally shall be enclosed in a protective transparent (transparent to the radiation used) shield fixedly mounted on the aircraft.

To avoid wind resistance, skin friction, and other disadvantages, it is necessary that the shield shall be as small as possible and accordingly the mounting should be arranged so that all movement of the reflector including rotation, takes place about three mutually perpendicular axes all of which pass through or substantially through, the middle of the said reflector.

The invention consists in an improved mounting for a stabilised platform on moving vehicles and is characterised in that said platform is supported in a system of four tracks circularly curved about two axes that intersect at right angles to one another and is stabilised relatively to the point of intersection by a vertical gyro.

In order that the nature of the invention may be the better understood it will now be described in relation to the radar scanner equipment, shown in the accompanying drawings, in which Figure 1 is a perspective view of one form of radar scanner arranged according to this invention; and Figure 2 is a perspective view of a modified form of radar scanner having parts broken away to show the internal arrangement.

The apparatus may be arranged in a variety of ways, in the example shown in the drawing the reflector 1 radiating energy is pivoted in a bridle 2 so that it can be tilted about the horizontal axis 3, that substantially passes through the middle of the reflector, by an electro-motor (not shown), and the bridle 2 is connected to a bracket 4 mounted on a shaft 4ª that can be rotated about its vertical axis, that substantially passes through the middle of the reflector, by the electro motor 5.

The vertical shaft 4ª is journalled in the member 6 that supports the motor 5 and forms a part of a carriage that, by means of rollers 8, 8 and pinion 9, cooperates with each of the two tracks 7, 7 (or roll tracks) circularly curved about an axis parallel with the roller axis of the vehicle and which passes through the middle of the reflector 1.

The rollers 8 are smooth-surfaced and cooperate with the upper smooth part 7ª of the track 7 to form a roller bearing for the carriage whilst each of the pinions 9 engages with a curved rack 9ª that forms the lower portion of the track 7, the centres of curvature of the tracks 7, 7 being on a line that substantially passes through the middle of the reflector 1.

Each pinion 9 is mounted on a spindle carrying a gear wheel 10 that meshes with the pinions 11, 11 mounted on the shaft 11ª, which shaft carries a gear wheel 12 that meshes with the pinion 13 of the electro-motor 13ª controlled by signals from the roll pick-off of the vertical gyro 14.

The ends of the roll tracks 7, 7 are attached to the side plates 15, 15 to form part of a carriage cooperating by means of rollers 17, 17 and a pinion 18 with each of two stationary tracks 16, 16 (or pitch tracks) circularly grooved about an axis parallel with the pitch axis of the vehicle and which passes through the middle of the reflector 1.

The rollers 17 are smooth-surfaced and cooperate with the upper smooth part 16ª of the track 16 to form a roller bearing for the carriage whilst each of the pinions 18 engages with a curved rack 19 that forms the lower portion of the track 16, the centres of curvature of the tracks 16, 16 being on a line that substantially passes through the middle of the reflector 1.

Each pinion 18 is mounted on a spindle carrying a gear wheel 20 that meshes with the pinions 21, 21 mounted on the shaft 21ª, which shaft carries a gear wheel 22 that meshes with the pinion 23 of the electro-motor 24 controlled by signals from the pitch pick-off of the vertical gyro 14.

From the above it will be seen that there are two somewhat similar assemblies mounted the one on the other and located at right angles to one another to form a spherical mounting for the reflector 1 the vertical shaft 4ª of which is stabilised relatively to the roll and pitch axes of the vehicle.

To provide data in azimuth a horizontal or directional gyro 25 is mounted on the member 6 which has means for transmitting the angle between the horizontal axis of the gyro and the gyro casing and this data can be compared with angular data transmitted from the vertical shaft 4ª.

The apparatus as a whole is fixed in position in the aircraft by the lugs 26 mounted on or forming part of the pitch tracks 16, 16 so that the reflector 1 and its wave guide projects beneath the lower covering into an enclosing dome of material transparent to the projected beam.

In the modification shown in Figure 2, the two curved roll tracks 71 and the two curved pitch tracks 161 are joined together at the ends to form a structure that is square in plan and that has two pairs of tracks that respectively are circularly curved about two normally horizontal axes that intersect at the centre of the reflector 1, one pair being curved about an axis parallel with the roll axis of the aircraft while the other pair is curved about an axis parallel with the pitch axis.

Each of the pitch tracks 161 is supported by rollers 171 pivoted on compensators mounted on a stationary frame 151 bolted to the aircraft by the lugs 26 and the roll tracks 71 support the rollers 81 pivoted on the carriage 61.

The inner surface of the upper parts of the pitch tracks 161 have curved racks mounted thereon, said racks having teeth 191 that cooperate with the pinions 181 rotated by the stationary electro-motor 241 through the shaft 210 carrying the pinions 211 that respectively mesh with the gear wheels 201.

The inner surface of the upper parts of the roll tracks 71 have curved racks mounted thereon, said racks having teeth 90 that cooperate with the pinions 91 mounted on the shaft 132 that is rotated by the electro-motor 130 through the pinion 131 that meshes with the gear wheel 121.

The electro-motor 130 is mounted on the movable carriage 61 which also carries the horizontal or directional gyro 25 and the motor 5 rotating the vertical shaft 4ª carrying the bridle 2 that provides support for the horizontal axis 3 about which the reflector 1 is tilted by an electro-motor (not shown).

The vertical shaft 4ª is stabilised relatively to the roll and pitch axes by the vertical gyro 14 mounted on the stationary frame 151, the operation of the electro-motor 241 being controlled by signals from the pitch pick-off while the operation of the electro-motor 130 is controlled by signals from the roll pick off.

Owing to practical considerations it is not always possible to arrange for all or any of the three axes to pass exactly through the middle of the reflector 1, in which case the axes are located as near to the defined centre as expedient, but in such case the enclosing shield will slightly exceed the minimum dimensions.

To enable the radiated beam to sweep over a conical path whilst the axis of the reflector spindle 4ª is maintained rigidly vertical, the reflector 1 is so mounted on the end of the vertical spindle 4ª that it can be angularly displaced about the transverse horizontal axis 3 that passes through or near to the middle of the reflector 1 by conveniently arranged remote control means.

What is claimed is:

1. A scanning device for radiant energy adapted to be mounted on a vehicle that is subjected to pitch and roll around right angularly related axes, comprising a first pair of arcuate tracks concentric with a third axis which is parallel with one of said angularly related axes, each of said tracks including an arcuate guide surface and a parallel rack facing said guide surface, said pair of tracks being mounted on said vehicle, a member having wheels engaging and movable relative to said first pair of tracks to change the angular relationship of said member and said tracks, gearing engaging the racks, a motor on said member for driving said gearing, a second pair of arcuate tracks supported by said first pair of tracks, said second pair of tracks being concentric with a fourth axis parallel with the other of said right angularly related axes and intersecting the axis of said first pair of tracks and each including an arcuate guide surface and a parallel rack facing the surface, a carriage having wheels engaging and movable along said second pair of tracks, gearing engaging the last-mentioned arcuate racks, a motor mounted on said carriage for driving the last-mentioned gearing a reflector for radiant energy mounted on said carriage and having its center substantially coinciding with the intersection of said third and fourth axes, gyroscope, and means connecting said gyroscope to said motors for moving said member and said carriage relatively to said tracks to compensate for pitch and roll of said vehicle.

2. A scanning device for radiant energy adapted to be mounted on a vehicle that is subjected to pitch and roll around right angularly related axes, comprising a first pair of arcuate tracks concentric with a third axis which is parallel with one of said angularly related axes, said pair of tracks being fixedly mounted on said vehicle, a member having wheels engaging and movable relative to said first pair of tracks to change the angular relationship of said member and said tracks, a motor on said member for moving the latter along said tracks, a second pair of arcuate tracks supported by said member and movable therewith, said second pair of tracks being concentric with a fourth axis parallel to the other of said right angularly related axes and intersecting the axis of said first pair of tracks, a carriage having wheels engaging and movable along said second pair of tracks, a motor on said carriage for moving it along said second pair of tracks, a shaft rotatably mounted on said carriage with its axis extending through the intersection of said third and fourth axes, means for rotating said shaft mounted on said carriage a reflector for radiant energy supported by said shaft with its middle substantially coinciding with said intersection, a gyroscope, and means connecting said gyroscope to said motors for moving said member and said carriage relatively to said tracks to maintain said shaft vertical.

3. A scanning device for radiant energy adapted to be mounted on a vehicle that is subjected to pitch and roll around right angularly related axes, comprising a first pair of arcuate tracks concentric with a third axis which is parallel with one of said angularly related axes, said pair of tracks being fixedly mounted on said vehicle, a member having wheels engaging and movable relative to said first pair of tracks to change the angular relationship of said member and said tracks, a motor mounted on said member for moving the latter along said tracks, a second pair of arcuate tracks supported by said member, said tracks being concentric with a fourth axis parallel to the other of said right angularly related axes and intersecting the axis of said first pair of tracks, a carriage having wheels engaging and movable along said second pair of tracks, a motor on said carriage for moving the latter along said second pair of tracks, a shaft rotatably mounted on said carriage with its axis extending through said intersection, means on said carriage for rotating said shaft a reflector for radiant energy, means supporting said reflector on said shaft for rotation with said shaft and rotation about an axis perpendicular to said shaft and with the middle of said reflector substantially coinciding with said intersection, a gyroscope, and means connecting said gyroscope to said motors for moving said member and said carriage along their respective tracks to maintain said shaft vertical.

4. A scanning device adapted to be mounted on a vehicle that is subjected to pitch and roll around right angularly related axes, comprising a first pair of parallel arcuate racks fixed to said vehicle, and being concentric with a first axis parallel with one of said right angularly related axes, a member supported by said pair of racks for movement therealong, a motor and gearing on said member for moving said member along said racks, a second pair of arcuate racks fixed to said member, said second pair of racks being concentric with a second axis intersecting said first axis and parallel with the other of said right angularly related axes, a carriage mounted on said second pair of racks for movement therealong, a motor and gearing on said carriage for moving said carriage along said second pair of racks, a reflector mounted on said carriage for movement about a vertical and a horizontal axis, intersecting at about the middle of said reflector and the intersection of said first and second axes, means for moving said reflector about said vertical and horizontal axes, a gyroscope, and means controlled by said gyroscope for actuating said motors to move said member and said carriage along said racks and maintain the vertical axes of rotation of said reflector vertical.

5. A scanning device comprising a first pair of arcuate tracks concentric with a first axis, a second pair of tracks fixed to said first pair of tracks and concentric with an axis intersecting and perpendicular to said first axis, said tracks forming a substantially square frame, a supporting structure having wheels engaging said first pair of tracks and supporting said frame for bodily movement about said first axis, means including a motor mounted on said support for so moving said frame, a carriage having wheels engaging said second pair of tracks for movement relative to the latter about said second axis, means including a motor mounted on said carriage for moving the latter along said second pair of tracks, a shaft rotatably mounted on said carriage and extending toward the intersection of said first and second axes, means including a motor mounted in said carriage for rotating said shaft, and a reflector mounted on said shaft for rotation therewith and about an axis at a right angle to said shaft, intersecting the first and second axes at their intersection.

DONALD ORR SPROULE.

REFERENCES CITED

The following references are of record in the file of this patent:

UNITED STATES PATENTS

| Number | Name | Date |
| --- | --- | --- |
| 919,004 | Haines | Apr. 20, 1909 |
| 1,215,233 | Alford | Feb. 6, 1917 |
| 1,970,630 | Searing | Aug. 21, 1934 |
| 2,014,825 | Watson | Sept. 17, 1935 |
| 2,199,294 | Seligmann | Apr. 30, 1940 |
| 2,231,929 | Lyman | Feb. 18, 1941 |
| 2,339,508 | Newell | Jan. 18, 1944 |
| 2,368,159 | Robins | Jan. 30, 1945 |
| 2,369,622 | Toulon | Feb. 13, 1945 |

FOREIGN PATENTS

| Number | Country | Date |
| --- | --- | --- |
| 698,210 | France | Nov. 17, 1930 |
| 485,822 | Great Britain | May 25, 1938 |